United States Patent [19]
Bral

[11] Patent Number: 5,935,032
[45] Date of Patent: Aug. 10, 1999

[54] TENSIONER WITH SECOND PIVOT-ARM FOR DAMPING MECHANISM

[75] Inventor: Serge A. Bral, Roetgen, Germany

[73] Assignee: The Gates Corporation, Denver, Colo.

[21] Appl. No.: 09/088,967

[22] Filed: Jun. 2, 1998

[51] Int. Cl.⁶ ............................................. F16H 7/14
[52] U.S. Cl. ........................ 474/117; 474/135; 474/138
[58] Field of Search .................................. 474/135, 138, 474/117, 133, 101, 109

[56] References Cited

U.S. PATENT DOCUMENTS

| | | |
|---|---|---|
| 4,883,446 | 11/1989 | Mitchell et al. ........................ 474/133 |
| 4,983,146 | 1/1991 | Charles et al. .......................... 474/117 |
| 5,045,029 | 9/1991 | Dec et al. ............................ 474/135 X |
| 5,045,031 | 9/1991 | Thomey . |
| 5,073,148 | 12/1991 | Dec ..................................... 474/135 X |
| 5,098,347 | 3/1992 | Sajczvk et al. . |
| 5,591,094 | 1/1997 | Farmer et al. . |
| 5,632,697 | 5/1997 | Serkh . |

*Primary Examiner*—Tamara L. Graysay
*Assistant Examiner*—Marcus Charles
*Attorney, Agent, or Firm*—C. H. Castleman, Esq.; S. G. Austin, Esq.; R. A. Jones, Esq.

[57] ABSTRACT

A tensioner with a base, a pivot-arm that oscillates about a pivot secured to the base, a pulley attached to the pivot-arm, a compression spring with a first end operatively connected to the pivot-arm and a second end operatively connected to a shoe that presses a convex surface of the shoe against a concave arcuate surface of the pivot-arm, and a second pivot-arm secured to the shoe and a second pivot secured to the base.

5 Claims, 1 Drawing Sheet

TENSIONER WITH SECOND PIVOT-ARM FOR DAMPING MECHANISM

BACKGROUND OF THE INVENTION

The invention relates to a tensioner for tensioning a belt of a belt drive system, but more particularly, the invention relates to a damping mechanism for a spring type tensioner where the spring biases the position of a pivot-arm to which a pulley is attached. While the tensioner of the invention may be used in various applications for tensioning belts, it is particularly useful in controlling belt tension of a V-ribbed belt as associated with a front end accessory drive or a synchronous belt as associated with a camshaft belt drive system for automotive applications.

Automatic tensioners of the mechanical type have designs for accommodating a particular type of spring to bias a position of the tensioner's pivot-arm. Various types of springs are known to be used to accommodate a particular design and include belville springs, volute springs, compression springs, tension springs, or torsional springs. Each type of spring offers some advantages while also introducing some design limitations for a tensioner. Perhaps, the spring most used today in automotive tensioners is a coiled torsional spring. An advantage of using a torsional spring is that four forces are needed to define two couples for winding the spring and wherein at least one of the forces can be advantageously used or "tapped" to operate a damping mechanism that inhibits movement of the pivot-arm.

While springs with torsional type tensioners have some design advantages such as the option to use one of the spring winding forces to generate damping, they also have some limitations. For example, the amount of available damping is limited to a function of a radius at which friction surface sliding takes place to effect damping. Also, torsional spring type tensioners must be mounted with its pivot-arm angled in a geometric manner relative to an engaged belt so that a trigonometric shortening and lengthening of the pivot-arm compensates for variations introduced by the coiled torsional spring. An example of a tensioner with a torsional spring and a damping mechanism operative with friction surface sliding at a radius is shown in U.S. Pat. No. 5,632,697.

Some of the disadvantages of using a coiled torsional spring for a tensioner may be overcome with a tensioner designed to use a compression spring. A compression spring may be operatively connected between a base member and a pivot-arm in such a manner that it provides substantially a constant torque output as measured at a pivot-arm. Also, the radius or moment about which friction surface sliding takes place may be increased to effect a larger percentage of damping. Examples of tensioners with compression springs are disclosed in U.S. Pat. Nos. 5,098,347; 5,045,031; and 5,591,094. While such tensioners solve some of the problems associated with torsional springs such as by providing a constant torque output and a larger radius at which damping takes place with friction surface sliding, they also introduce their own disadvantages. One of the disadvantages is that only two forces are available to "tap" with a compression spring as opposed to four forces available for "tapping" with a torsional spring. Consequently, and with only two available forces, there is no force of a compression spring that is easily "tapped" to provide a force for a damping mechanism. More particularly, there is a problem of defining a force for damping that is additive to a hub load to effect a total force available for a damping mechanism. In other words, the prior art tensioners are unable to define a spring force for a damping mechanism in conjunction with a single compression spring that biases a position of a pivot-arm. The prior art solved the spring force problem for damping with the addition of a second spring such as a U-shaped leaf spring or a second compression spring where the springs provide a constant force which results in constant (as opposed to variable) damping of a pivot-arm.

This invention is directed to those tensioner designs that incorporate a compression spring to bias the position of a pivot-arm and to solving the prior art problem of the necessity of using a second spring to provide a force to a damping mechanism to effect damping by friction surface sliding.

SUMMARY OF THE INVENTION

In accordance with the invention, an automatic mechanical tensioner is provided that is useful to tension a belt of a belt drive system. The tensioner may be used in conjunction with a synchronous belt drive system or a V-ribbed front-end-accessory drive belt system, both of which are used in automotive applications.

The tensioner is of the type with a base, a pivot-arm that oscillates about a pivot secured to the base, a pulley attached to the pivot-arm and for engaging a belt, a compression spring with a first end operatively connected to the pivot-arm, and a damping mechanism that inhibits oscillatory movements of the pivot-arm.

In accordance with the invention, only a single compression spring is required. The spring is "hooked up" in such a way that the same spring force used to bias position of the pivot-arm, is also "tapped" and used as a force for the damping mechanism.

The pivot-arm includes an extension or portion with a concave arcuate surface that moves with the pivot-arm. A moveable shoe (or damping pad) with a convex arcuate friction surface engages the concave arcuate surface. The compression spring is held in a position between the damping shoe and pivot-arm by way of a second pivot-arm with one end attached to the base and the other end attached to the shoe. The second pivot-arm retains the shoe and keeps it from moving in relation to the concave arcuate surface. Friction surface sliding takes place between the shoe and concave surface to effect damping.

An object of the invention is to use only one compression spring to provide both a biasing force to a pivot-arm and a contributory force to a damping mechanism.

An advantage of the invention is that a pulley attached to a pivot-arm receives a belt load and generates a spring force that adds to a force for the damping mechanism when the pulley moves in a direction that compresses the spring.

Another advantage of the invention is that the damping mechanism is self-energizing in one direction of rotation of the pivot-arm which results in asymetric damping of the pivot-arm.

These and other objects or advantages of the invention will be apparent after reviewing the drawings and description thereof wherein:

FIG. 1 is a front view schematic of a synchronous (timing) belt drive system of the automotive type which includes a tensioner of the invention; and FIG. 2 is a view taken generally within the line 2—2 of FIG. 1 and showing an enlarged and partially broken away view of a belt tensioner of the invention.

DESCRIPTION OF PREFERRED EMBODIMENTS

Figure 1:
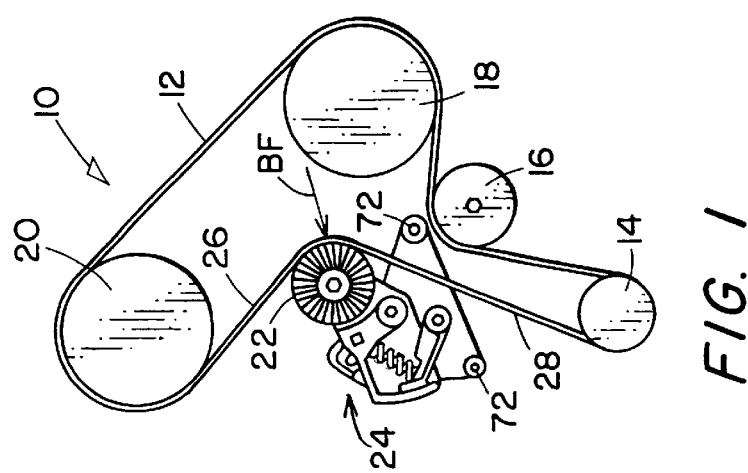

Referring to FIG. 1 and for purpose of illustration without limitation to a particular belt drive system, a synchronous "timing" belt drive system 10 includes a toothed belt 12 entrained and tensioned around a crank pulley 14, an idler pulley 16, and an injection pump pulley 18, a cam shaft pulley 20, and a tensioning pulley 22 of a tensioner 24 of the invention.

The tensioning pulley 22 engages the belt 12 and receives a belt load in the form of belt tension of adjacent belt spans 26, 28. The belt tension of the spans combine to generate a belt force component BF which oftentimes is referred to as "hub load." The belt force component BF occurs along a bisector of an angle formed between the belt spans 26, 28.

Figure 2:
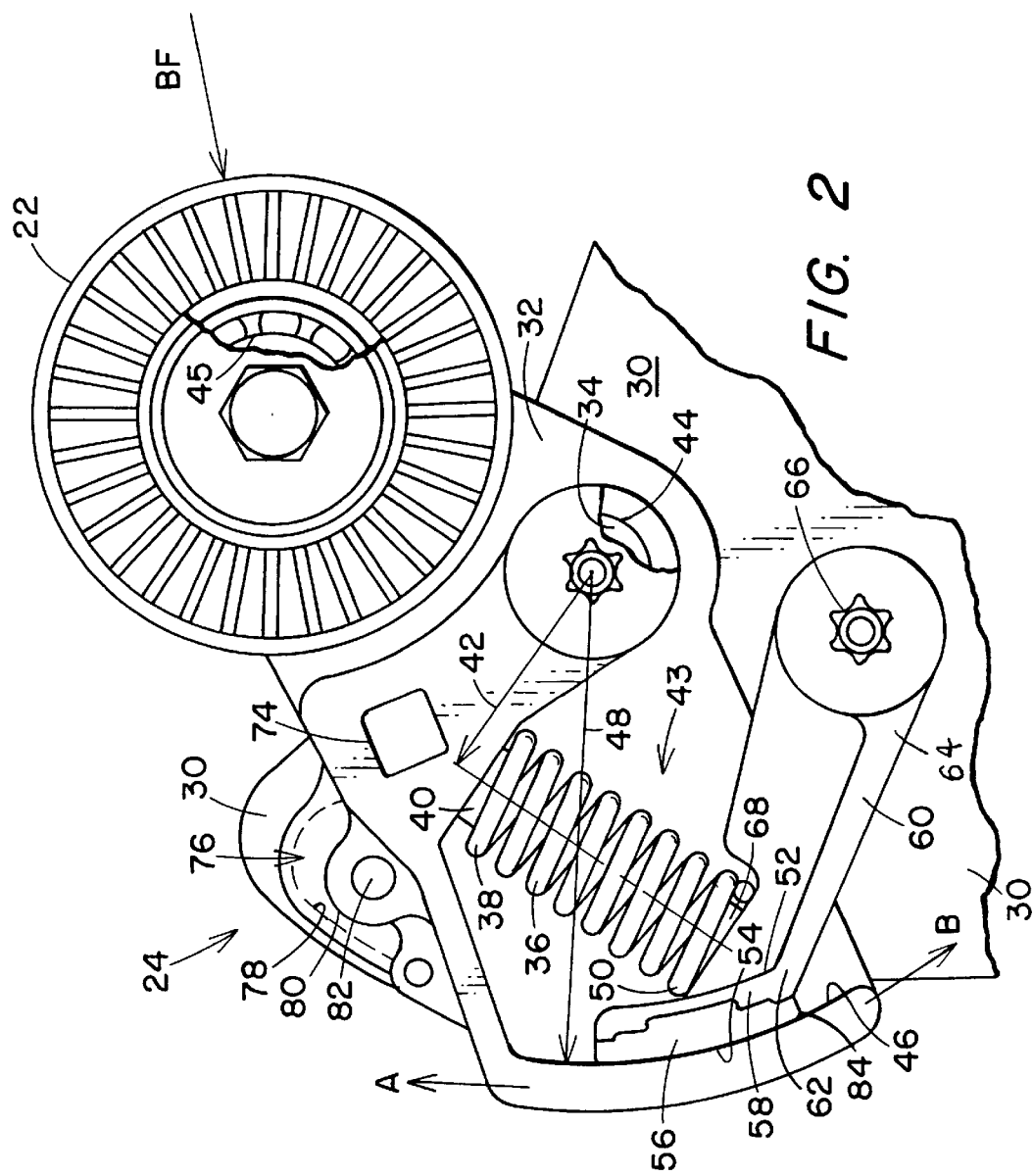

Referring more particularly to FIG. 2, the tensioner includes: a base 30; a pivot-arm 32 that oscillates about a pivot 34 secured to the base 30, a pulley 22 attached to the pivot-arm and for engaging the belt 26 and receiving a belt force BF; a compression spring 36 with a first end 38 operatively connected to the pivot-arm 32 such as by a boss 40 located at an operative radius 42 in relation to the pivot; and a damping mechanism 43. A bushing 44 is interpositioned between the pivot and pivot-arm in known fashion and the pulley is attached to the pivot-arm by way of a ball bearing 45, also in known fashion.

The pivot-arm 32 includes an extension or portion in the form of a concave arcuate surface 46 that moves with the pivot-arm and is spaced a radial distance 48 from the pivot 34. The concave arcuate surface 46 is oriented to generally face the pivot 34 and a second end 50 of the compression spring 36.

The arcuate surface 46 is substantially concentric with the pivot, and optionally, has a radial distance 48 that is equal or greater than the operative radius 42 for greater damping (i.e. the larger the radius, the larger the damping torque for a given damping force).

The damping mechanism 43 includes a moveable shoe 52 with a convex arcuate friction surface 54 that is complimentary to and engages the concave arcuate surface 46 of the pivot-arm. As shown, the shoe may be in two-part form with a pad of friction material 56 attached to and backed up 58 by the shoe. A second pivot-arm 60 has a first end 62 secured to the shoe such as by being integrally formed with the shoe as shown. A second end of the second pivot-arm is secured at a second end 64 to a second pivot 66 that is secured to the base 30. The shoe has a spring receiving portion such as a boss 68 that faces and attaches the second end 50 of the compression spring. A bushing 70 such as of the polymeric type, or of any other suitable material such as PTFE with bronze fabric, may be optionally interpositioned between the second pivot and second pivot-arm. A bushing is not essential because the second pivot-arm does not continually oscillate. The second pivot-arm only slowly rotates as the friction surface of the shoe wears when the tensioner is in use.

The compression spring being biased between the first pivot-arm and shoe attached to the second pivot-arm, operates to press the convex surface 54 of the shoe (pad 56) against the concave surface 46 of the pivot-arm 32 to effect damping.

For use, the tensioner 24 is located adjacent its installed position to an automotive engine and fasteners such as bolts 72, attach the tensioner to an engine (not shown). A toothed belt 12 is entrained around the crank pulley 14, idler pulley 16, injection pump pulley 18, and cam pulley 20. A wrenching surface 74 is optionally provided as a means to rotate the tensioner with a wrench (in this case counterclockwise) to a position away from the belt for easy belt installation. With the belt in the correct position, the pivot-arm is allowed to rotate (clockwise) to where the pulley presses against the belt to its belt engaging position as shown in FIG. 1. The toothed belt 12 is tensioned as the pulley is positioned in pressing engagement against the belt.

The pulley is pressed into engagement by means of the compression spring pushing on the pivot-arm at its operative radius 42 so as to rotate the pivot-arm which in this case, is clockwise. The compression spring also presses against the damping shoe which is held in position relative to the base by means of the second pivot-arm 60. The spring presses the shoe against the concave arcuate surface 46 of the pivot-arm. The arcuate surface 46 angularly oscillates A,B in response to angular movements of the pivot-arm 32. The damping shoe 52 (pad 56) operates to damp angular movements of the pivot-arm by friction surface sliding between the concave arcuate surface 46 of the pivot-arm and convex arcuate surface 54 of the damping shoe. The second pivot-arm in conjunction with the concave surface operates to keep the second end of the spring in substantially a fixed position in relation to the base so that the spring can bias the pivot-arm to press the pulley against the belt.

The location of the second pivot 66 is below one end 84 of the damping shoe. Consequently, the shoe is "self energizing" as the concave arcuate surface 46 moves counterclockwise (in the B direction) and it releases as the concave arcuate surface 46 moves clockwise (in the A direction). The self-energizing arrangement results in increased friction surface sliding in the counterclockwise direction and reduced friction surface sliding in the clockwise direction which results in asymmetric damping of the pivot-arm 32.

Should the tension in the belt spans 26, 28, momentarily increase from an engine operating condition, the belt will press against the pulley with an increased force BF that operates to rotate the pivot-arm counterclockwise B and further compress the compression spring 36 resulting in an increased spring force. The increase in spring force operates to press against the damping shoe with increased force and thereby increases friction surface sliding at the shoe which operates to inhibit the pivot-arm from moving in the counterclockwise direction. Once the tension in the span decreases and the belt force reduces, the pulley is quickly pressed against the belt span by means of the compression spring 36 so as to maintain a belt tension (by a decreased damping level).

Optionally, an adjustable stop 76 may be provided between the pivot-arm 32 and base 30. The adjustable stop is in the form of a slot 78 formed in the base, a moveable stop member 80 which is attached to the pivot-arm by means of a fastener 82.

The foregoing description is made for purpose of illustration only and is not intended to limit the scope of the invention which is to be determined by the appended claims.

What is claimed is:

1. A tensioner for tensioning a belt, the tensioner having a base; a pivot-arm that oscillates about a pivot secured to the base; a pulley attached to the pivot-arm and for engaging the belt; a compression spring with a first end operatively connected to the pivot-arm at an operative radius in relation to the pivot; and a damping mechanism that inhibits oscillatory movements of the pivot-arm; and wherein the improvement comprises:

the pivot-arm including a concave arcuate surface that moves with the pivot-arm and is spaced a distance from the pivot, the concave arcuate surface oriented to generally face the pivot and a second end of the compression spring;

the damping mechanism including a moveable shoe with a convex arcuate friction surface substantially complimentary to and engaging the concave arcuate surface of the pivot-arm, a second pivot-arm with a first end secured to the shoe and a second end secured at a second pivot to the base, the shoe having a spring receiving portion that faces and attaches to a second end of the spring; and wherein the spring is biased between the pivot-arm and shoe and operates to press the convex surface of the shoe against the concave surface of the pivot-arm.

2. The tensioner as claimed in claim 1 wherein the spaced distance of the concave arcuate surface of the pivot-arm from the pivot is equal to or greater than the operative radius for the spring.

3. The tensioner as claimed in claim 1 where the concave arcuate surface of the pivot-arm is substantially concentric with the pivot.

4. The tensioner as claimed in claim 1 wherein the shoe is self energizing in one direction relative to movement of the concave arcuate surface.

5. The tensioner as claimed in claim 1 wherein the shoe is integrally formed as part of the second pivot-arm and includes a pad of polymeric material that forms the convex arcuate surface.

* * * * *